US010279522B2

(12) United States Patent
Charnay

(10) Patent No.: US 10,279,522 B2
(45) Date of Patent: May 7, 2019

(54) METHOD FOR PRODUCING A MEMBER FOR APPLYING COSMETIC PRODUCT, AND ASSOCIATED ASSEMBLY FOR THE PRODUCTION THEREOF

(71) Applicant: L'OREAL, Paris (FR)

(72) Inventor: Patrick Charnay, Polliat (FR)

(73) Assignee: L'OREAL, Paris (FR)

( * ) Notice: Subject to any disclaimer, the term of this patent is extended or adjusted under 35 U.S.C. 154(b) by 1006 days.

(21) Appl. No.: 14/353,659

(22) PCT Filed: Oct. 24, 2012

(86) PCT No.: PCT/EP2012/071068
§ 371 (c)(1),
(2) Date: Apr. 23, 2014

(87) PCT Pub. No.: WO2013/060730
PCT Pub. Date: May 2, 2013

(65) Prior Publication Data
US 2014/0291891 A1    Oct. 2, 2014

(30) Foreign Application Priority Data

Oct. 25, 2011 (FR) .................................. 11 59655

(51) Int. Cl.
*B29C 45/16* (2006.01)
*A46B 9/02* (2006.01)
(Continued)

(52) U.S. Cl.
CPC .......... *B29C 45/1671* (2013.01); *A46B 9/021* (2013.01); *A46D 3/00* (2013.01);
(Continued)

(58) Field of Classification Search
CPC ............ B29C 45/1671; B29C 45/1635; B29C 45/1676; B29C 2045/1678; A46B 9/021;
(Continued)

(56) References Cited

U.S. PATENT DOCUMENTS 5,911,924 A * 6/1999 Siegrist ............... B29C 45/5008
264/328.1
6,464,920 B1 * 10/2002 Kramer .................. B29C 45/16
15/143.1
(Continued)

FOREIGN PATENT DOCUMENTS

DE 102012012114 * 12/2013 ............... A46D 3/00
EP 2030524 A1 3/2009
(Continued)

*Primary Examiner* — Nahida Sultana
(74) *Attorney, Agent, or Firm* — Polsinelli PC

(57) ABSTRACT

The method for producing a member for applying a cosmetic product comprising:
an application portion (3);
a longitudinal core (5), housed in the application portion (3);
the method comprising the following successive steps:
a first step for injecting the application portion (3) into a cavity (29) of a mold (27);
a second step for injecting the longitudinal core (5) into the cavity (29) of the mold (27).
In the first step, a pin (31) is arranged in the cavity (29) and in the second step, the pin (31) is moved relative to the cavity (29), and the longitudinal core (5) is injected into a space (47) freed up by the pin (31).

27 Claims, 1 Drawing Sheet

(51) Int. Cl.
*A46D 3/00* (2006.01)
*B29L 31/42* (2006.01)
*B29L 31/00* (2006.01)
*A46B 3/00* (2006.01)

(52) U.S. Cl.
CPC ...... *B29C 45/1635* (2013.01); *B29C 45/1676* (2013.01); *A46B 3/005* (2013.01); *B29C 2045/1678* (2013.01); *B29L 2031/42* (2013.01); *B29L 2031/718* (2013.01)

(58) Field of Classification Search
CPC ....... A46B 3/005; A46D 3/00; B29L 2031/42; B29L 2031/718
USPC ..... 425/127; 264/296, 328.1, 243, 255, 273, 264/279
See application file for complete search history.

(56) References Cited

U.S. PATENT DOCUMENTS

| | | | | |
|---|---|---|---|---|
| 6,827,895 | B1* | 12/2004 | Yamamoto | B29C 45/14 264/266 |
| 7,632,489 | B2* | 12/2009 | Wyatt | A46B 1/00 132/208 |
| 7,790,087 | B2* | 9/2010 | Klein | A45D 40/16 264/255 |
| 2003/0163884 | A1* | 9/2003 | Weihrauch | A46B 3/22 15/207.2 |
| 2006/0260633 | A1* | 11/2006 | Wyatt | A46B 1/00 132/218 |
| 2009/0083925 | A1* | 4/2009 | Mathiez | A46B 3/005 15/207.2 |
| 2009/0158540 | A1* | 6/2009 | Baertschi | A46B 5/0025 15/143.1 |
| 2009/0274889 | A1* | 11/2009 | Iwahashi | B29C 45/14311 428/312.8 |
| 2011/0226276 | A1* | 9/2011 | Limongi | A46B 9/021 132/218 |
| 2012/0161362 | A1* | 6/2012 | Ludwig | H01L 21/565 264/272.14 |
| 2012/0227199 | A1* | 9/2012 | Lee | A61C 17/3481 15/167.1 |
| 2013/0032166 | A1* | 2/2013 | Kim | A46B 3/005 132/218 |
| 2013/0291320 | A1* | 11/2013 | Kirchhofer | A46B 1/00 15/22.1 |
| 2014/0001819 | A1* | 1/2014 | Wolfsgruber | A46D 3/00 300/2 |
| 2014/0137354 | A1* | 5/2014 | Newman | A46B 9/04 15/167.1 |
| 2015/0164207 | A1* | 6/2015 | Wolfsgruber | B29C 45/14344 15/187 |

FOREIGN PATENT DOCUMENTS

| | | |
|---|---|---|
| FR | 2572676 A1 | 5/1986 |
| WO | WO-2006/124228 A1 | 11/2006 |
| WO | WO-2007/135557 A1 | 11/2007 |
| WO | WO-2008/091128 A1 | 7/2008 |

\* cited by examiner

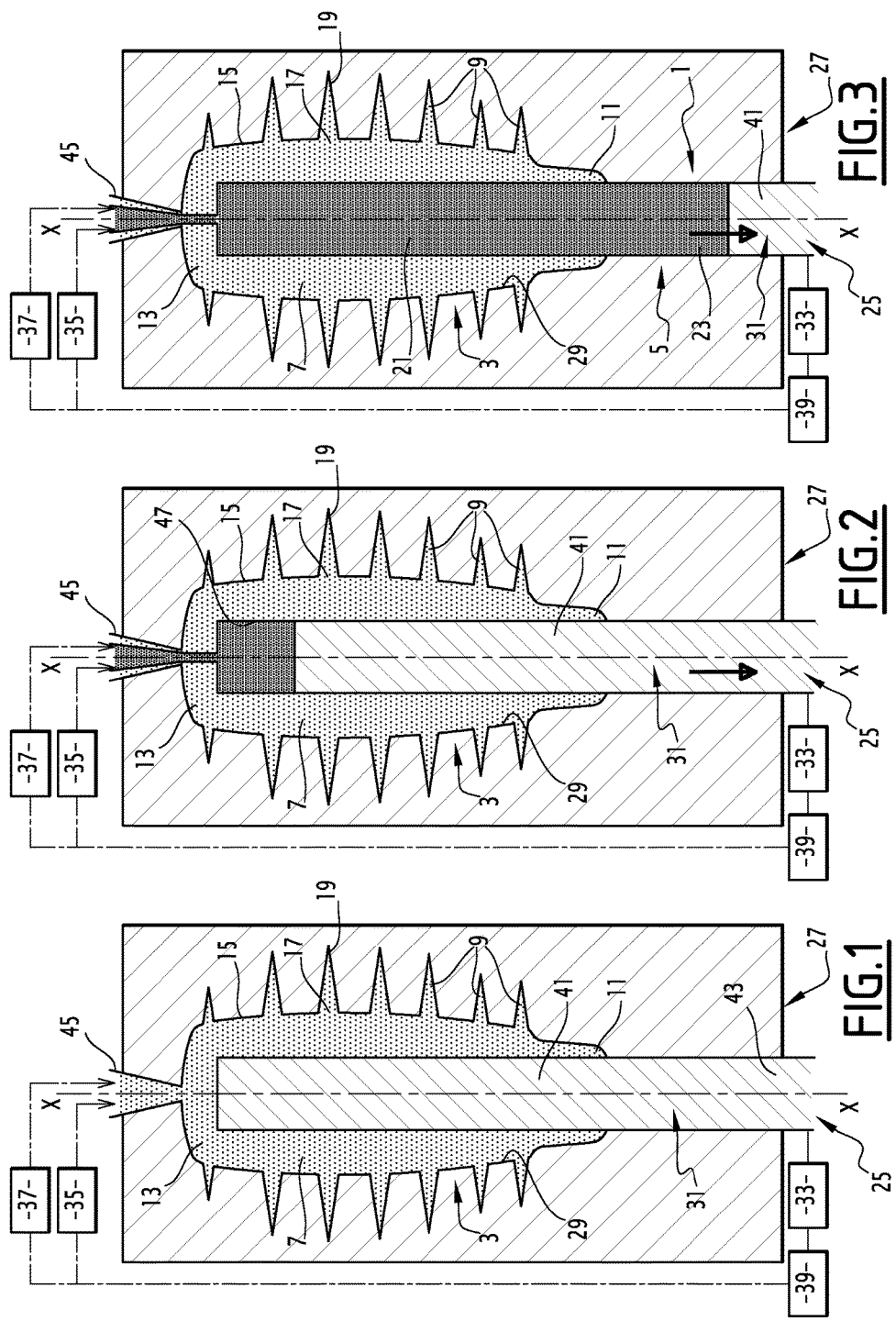

METHOD FOR PRODUCING A MEMBER FOR APPLYING COSMETIC PRODUCT, AND ASSOCIATED ASSEMBLY FOR THE PRODUCTION THEREOF

CROSS REFERENCE TO RELATED APPLICATIONS

This application is a National Phase filing under 35 U.S.C. § 371 of PCT/EP2012/071068 filed on Oct. 24, 2012; and this application claims priority to Application No. 1159655 filed in France on Oct. 25, 2011; the entire contents of all are hereby incorporated by reference.

The present invention relates generally to methods for producing members for applying cosmetic products, notably brushes.

More specifically, the invention relates, according to a first aspect, to a method for producing a member for applying a cosmetic product, the application member comprising:
an application portion;
a longitudinal core, housed in the application portion;
the method being of the type comprising the following successive steps:
a first step for injecting the application portion into a cavity of a mold;
a second step for injecting the longitudinal core into the cavity of the mold.

Such a method is known from EP 2 030 524. This document describes a method for injecting a brush wherein a first material intended to form the application portion, and a second material intended to form the longitudinal core, are injected into the cavity of the mold successively via the same orifice. The second material is injected before the first material has set.

In such a method, it is difficult to obtain the sought distribution, i.e. obtain an application member wherein the core is entirely covered by the application portion.

Indeed, the first material does not fill the cavity of the mold entirely at the end of the first step, so as to leave space for the second material. The second material is injected via the same injection point as the first material, such that it creates a pocket inside the first material. As the second material is injected, this pocket expands, since the second material filling the pocket pushes the first material toward the periphery of the cavity. The first material forms a balloon or a bubble so to speak, that expands under the effect of the injection of the second material.

The injection rate and the injection pressure of the second material should be controlled very precisely to prevent the bubble formed from the first material from tearing, giving rise to the appearance of areas wherein the second material, i.e. the longitudinal core, is not covered by the application portion.

In this context, the aim of the invention is that of providing a method wherein the material distribution is enhanced.

For this purpose, the invention relates to a production method of the aforementioned type, characterized in that:
in the first step, a pin is arranged inside the cavity;
in the second step, the pin is moved relative to the cavity and the longitudinal core is injected into a space freed up by the pin.

In this way, the longitudinal core is injected into a space previously occupied by the pin. The material forming the longitudinal core does not need or practically does not need to push the material forming the application portion at the time of injection. The likelihood of tearing occurring in the application portion during the injection of the longitudinal core is thus significantly reduced.

The distribution of the material forming the application portion in the cavity is enhanced in that the pin is arranged inside the cavity in the first step, i.e. the step for injecting the application portion. The material, due to the presence of the pin, is distributed at the periphery of the cavity, such that it is not necessary for the material forming the core to push the material forming the application portion to finish filling the cavity.

In other words, the pin is suitable for creating a housing inside the application portion for receiving the longitudinal core. Moving the pin relative to the cavity makes it possible to free up this housing and is thus suitable for injecting the longitudinal core into said housing.

The second injection step may be performed while the material forming the application portion has partially set. This limits the likelihood of tearing occurring in the application portion during the injection of the longitudinal core.

Furthermore, during the second injection step, the high-temperature material forming the longitudinal core is injected into the space freed up by moving the pin, and melts the surface of the application portion defining this space. The materials forming the application portion and the longitudinal core may thus be mixed, creating, after cooling, a bond having a high mechanical strength between the core and the application portion. This mechanical strength is enhanced further if the second injection step is performed before the material forming the application portion has set excessively, so as to promote mixing between the two materials on the surface of the space freed up by the pin.

In the method according to the invention, controlling the pressure and rate for injecting the longitudinal core is much less critical than in the prior art. In this way, the longitudinal core may be injected with a faster injection rate, reducing the cycle time.

Furthermore, with the production method according to the invention, it is possible to use molds comprising a plurality of cavities, operating in parallel. The cavities are supplied by a common injection device for all the cavities. In other words, the injection orifices of the various cavities are connected to the same material feed line. The mold may comprise more than four cavities. For example, the mold may comprise between four and eight cavities, and preferably between eight and sixteen cavities.

In the prior art, it is not possible to use a mold comprising for example four cavities serviced by the same feed line. Indeed, in that controlling the injection pressure and rate is critical for obtaining satisfactory material distribution, it is essential for each cavity to have its own feed circuit.

In this way, the production method according to the invention makes it possible to reduce the cycle time for producing an application member considerably.

The application member may be suitable for any type of applicator of cosmetic product: gloss, eye shadow, care product, etc. The applicator is typically a brush, for example a mascara brush.

The application portion preferably comprises a longitudinal support portion and a plurality of application elements protruding from the support portion, the longitudinal core being housed inside the support portion.

The support portion typically has a longitudinally elongated shape. It has for example a constant cross-section in a transverse plan in relation to the longitudinal axis. It has for example tubular shape, typically with a circular cross-section. Alternatively, the support portion has a barrel shape, having a larger cross-section in a longitudinally central portion and a smaller cross-section at both opposite longitudinal ends thereof. Preferably, the support portion has a rotational symmetry about the longitudinal axis.

The support portion preferably has a rectilinear shape. Alternatively, the central axis thereof is slightly arched, and is not strictly parallel with the longitudinal axis.

The application elements, also referred to as bristles, typically extend substantially radially relative to the longitudinal central axis of the support portion. They may also be inclined in relation to the radial direction.

These application elements are integral, more specifically injected, with the support portion. They protrude from an outer surface of the support portion. They are each fixed to the support portion via one base end and are each free at the opposite end.

The application elements are typically regularly distributed longitudinally along the support portion. They are also typically regularly distributed about the longitudinal central axis. Alternatively, the application elements are distributed at random longitudinally, or circumferentially about the longitudinal central axis. They may also be arranged according to all sorts of patterns on the outer surface of the longitudinal support portion, for example distributed in a circle, each circle being centered on the central longitudinal axis, or distributed along a helix wound around the central axis, or be gathered into bundles, etc.

Alternatively, the application elements are all arranged on one side of the support portion, i.e. not covering the entire periphery of the support portion. They also may not cover the entire longitudinal length of the support portion.

According to a further alternative embodiment, the application portion does not comprise application elements. For example, the application member is a roller wherein the longitudinal core forms the central axis.

The application member is envisaged for applying a cosmetic product. A cosmetic product denotes herein a product in compliance with EC Council Directive 93/35 of Jun. 14, 1993.

This cosmetic product may be in liquid form, solid form, in the form of a powder, gel or any other form.

This product may be a mascara, lipstick, gloss, hair or skin care product, hygiene product, etc.

The mold cavity typically has a shape complementary to the shape of the application member to be injected. As mentioned above, in the first step, the pin is arranged inside the cavity. This means that at least a portion of said pin is situated inside the cavity during the first injection step. In the second step, the pin is moved relative to the cavity. This means that the pin moves back relative to the cavity, insofar as it is partially or completely removed from the cavity. In other words, the pin moves from a first position, occupied in the first step, to a second position. The pin moves between these first and second positions according to a longitudinal movement typically in translation. In the first position, the pin is inserted inside the cavity along a first length. In the second position, the pin is inserted inside the cavity along a second length, less than the first.

The term pin denotes herein a part having a longitudinally elongated shape, typically having the shape of a rod with a small cross-section in relation to the length thereof.

Preferably, the pin has a portion having substantially the same shape as the longitudinal core. This portion is fully inserted into the cavity in the first step. Alternatively, the pin has a slightly different shape to that of the longitudinal core. The space freed up by the pin is then typically slightly deformed when injecting the longitudinal core. In this way, the injection pressure may be relatively low, since the material injected to form the longitudinal core does not need to push the material forming the application portion to create a free space.

Preferably, in the first step, the application portion is injected around the pin. The pin thus occupies substantially the center of the cavity, the material forming the application portion alone being distributed around the pin. This favors homogeneous distribution of this material in the cavity.

Typically, the application portion is made of a first material, the longitudinal core being made of a second material different to the first. Different properties can thus be given to the application portion and to the longitudinal core.

This is particularly advantageous when the second material is more rigid than the first material. In this way, the application member comprises a relatively rigid core giving the application member a high mechanical strength. The application portion is made of a more flexible material, which is more pleasant for the user. The first material may also be a material which is softer to the touch than the second material. Both materials may have different colors and different textures. The first material may be slightly translucent to show the second material, etc.

Typically, the longitudinal core is injected concomitantly with the movement of the pin. In this way, as the pin moves and progressively frees up a space in the cavity, the longitudinal core is injected. This makes it possible to speed up the cycle time. In particular, the injection of the longitudinal core and the movement of the pin are preferably synchronized so that the space freed up by the pin is constantly filled with an injected material. In this way, there is no void inside the cavity, which could lead to deformation of the application portion or to subsidence of this application portion in a void formed between the pin that has previously moved and the longitudinal core being injected.

Alternatively, the pin is firstly moved back and the core is secondly injected once the pin has fully moved back.

Typically, the longitudinal core and the application portion are injected via the same injection orifice of the mold, opening into the cavity. This makes it possible to simplify the structure of the mold. This also makes it possible to produce small application members, for which it is difficult to provide two injection points in the cavity.

Typically, the core protrudes from the application portion longitudinally on a first side of the application portion. In other words, the core comprises a first longitudinal segment housed inside the application portion, and a second longitudinal segment extending the first, intended to form a handle or to be connected to another part.

In this case, the common injection orifice for the application portion and for the longitudinal core is situated on a second side of the application portion, opposite the first side. This enables convenient injection both of the application portion and the longitudinal core. In this way, the orifice does not affect the travel of the pin.

According to a second aspect, the invention relates to an assembly for producing a member for applying cosmetic product, envisaged for the use of the above method. The device comprises:
  a mold having a cavity;
  a pin;
  a device provided for moving the pin relative to the cavity;
  a device for injecting the application portion into the cavity;
  a device for injecting the longitudinal core into the cavity;

a computer programmed to control the production assembly so as to implement the following successive steps:
a first step for injecting the application portion into the cavity, the pin being arranged in the cavity;
a second step for injecting the longitudinal core into the cavity, during which the pin is moved relative to the cavity, and the longitudinal core is injected into a space freed up by the pin.

Other characteristics and advantages will become clear from the detailed description given below, for guidance and in no way limitative, with reference to the appended drawings among which:

FIG. 1 is a simplified schematic representation of a production assembly according to the invention, represented at the end of the first injection step;

FIGS. 2 and 3 are similar views to that in FIG. 1, represented during the second injection step, and at the end of the second injection step, respectively.

The production assembly 1 represented in FIGS. 1 to 3 is intended for the production of a brush for applying a cosmetic product, typically a mascara brush.

As seen notably in FIG. 3, the brush 1 comprises an application portion 3, and a core 5. The application portion 3 in turn comprises a longitudinal support portion 7, and a plurality of application elements 9 protruding from the support portion 7.

The support portion 7 has an elongated shape along a longitudinal direction, and has a longitudinal central axis X. The support portion 7 has a rotational symmetry about the axis X. The cross-section thereof varies slightly along the longitudinal axis. It increases from a first longitudinal end 11 up to substantially a central point of the portion 7, and decreases up to a second longitudinal end 13 opposite the first. The application elements 9 protrude from an outer peripheral surface 15 of the support portion. In the example shown, the application elements 9 are in the form of points or bristles. They extend along substantially radial directions relative to the axis X. They are each fixed by an enlarged base 17 to the support portion, and are each tapered up to a free end 19.

The longitudinal core 5 is a substantially rectilinear part, extending along the axis X. The core 5 comprises a first segment 21 housed in the support portion 7, and a second segment 23 extending the first segment 21, and protruding from the support portion 7. The segment 23 protrudes from the support portion 7 on a first longitudinal side thereof, i.e. on the side of the end 11.

The second segment 23 is intended to be connected to a handle to be held by the user in order to use the brush. The first segment 21 extends along most of the longitudinal length of the support portion 7. It extends, from the end 11, practically up to the end 13.

The production assembly 25 comprises, as seen in FIGS. 1 to 3:
a mold 27 internally defining a cavity 29;
a longitudinal pin 31;
a device 33 provided for moving the pin 31 relative to the cavity 29;
a device 35 for injecting the application portion 3 into the cavity 29;
a device 37 for injecting the longitudinal core 5 into the cavity;
a computer 39 provided for controlling the production assembly.

The mold 27 typically comprises two half-molds mutually defining the cavity 29. The half-molds are movable relative to each other to be able to remove the application member after injection.

The cavity 29 has a complementary shape to that of the application member 1.

The pin 31 is a longitudinally extending rod. It comprises an active portion 41 having substantially the shape of the core 5. The active portion 41 is extended by a connection portion 43 provided for engaging with the movement device 33. The device 33 is arranged to move the pin 31 relative to the cavity and relative to the mold longitudinally, between a first portion represented in FIG. 1 and a second position represented in FIG. 3. In the first position, the pin 31 is inserted into the cavity along a first length. In the second position, the pin 31 is inserted inside the cavity along a second length, less than the first. More specifically, in the first position, the entire active portion 41 of the pin is inserted into the cavity. Typically, only this active portion 41 is inserted into the cavity. In the second position, the pin 31 is fully removed from the cavity 29.

The device 33 is of any type suitable for moving the pin. For example, the device 33 is of the rack and pinion type.

The mold 27 comprises a single injection orifice 45, provided for injecting both the application portion 3 and the longitudinal core 5. The injection orifice 45 is situated on the second side of the application portion, i.e. on the side of the end 13.

The device 35 for injecting the application portion 3 is arranged to supply the orifice 45 with a first molten material, under pressure, intended to form the application portion 3. These means are known and will not be detailed herein. The device 37 for injecting the core 5 is provided for supplying the orifice 45 with a second molten material, also under pressure. The device 37 will not be described herein.

The first material is for example TPE, TPU or PE. The second material is typically a material having a melting point below that of the first material, for example PP, PE, PBT or PET. The injection pressure of the first material is between 350 and 1200 bar. The rate of injection of the first material is between 2 and 30 m/s. The rate of injection of the second material is between 2 and 30 m/s. The injection pressure of the second material is between 350 and 1200 bar.

The computer 39 is programmed to implement the following method.

During a first injection step, illustrated in FIG. 1, the material forming the application portion 3 is injected into the cavity 29 of the mold. The pin 31 is then in the first position thereof. It extends along practically the entire longitudinal length of the cavity. The end thereof stops at a short distance from the injection orifice 45, for example at a distance between 1 and 3 mm, preferably at 1.5 mm. The first material is injected by the device 35. It is distributed around the pin and fills the entire cavity, with the exception of the space occupied by the pin.

Once the first step has been completed, the computer 39 orders the implementation of a second step, during which the longitudinal core 5 is injected into the cavity 29. During this second step, the computer orders the progressive reverse movement of the pin 31, from the first position thereof to the second position thereof. The device 33 thus moves the pin in translation to the second position. Concomitantly, the device 37 supplies the injection orifice 45 with the second material, intended to form the core 5. As it moves back, the pin 31 frees up a space 47 inside the cavity. The second material, entering via the injection orifice 45, applies a pressure onto the area of the first material separating the injection orifice 45 from the space 47.

The injection pressure of the second material chosen is sufficiently high so that the second material can break the area of the first material separating the injection point 45 from the space 47. Once this area has been broken, the second material can flow into the space 47 freed up by the reverse movement of the pin.

The speed at which the pin moves back and the rate of injection of the second material are synchronized such that the space freed up by the pin is constantly completely filled with the injected material. In other words, the injection pressure and the flow area for the second material are chosen such that, in view of the rate at which the space 47 is freed up by the pin, the volume of second material injected is equal to the space freed up at all times.

When the pin reaches the second position thereof, the second injection step is complete. The mold is then opened and the application member is removed from the cavity, after cooling if required.

The invention claimed is:

1. A method for producing a member for applying a cosmetic product, the application member comprising:
   an application portion;
   a longitudinal core, housed in the application portion; and
   wherein the application portion comprises a longitudinal support portion and a plurality of application elements protruding from the support portion, the longitudinal core being housed in the support portion and being radially enclosed in the application portion;
the method comprising the following successive steps:
   a first step for injecting the application portion into a cavity of a mold;
   a second step for injecting the longitudinal core into the cavity of the mold wherein,
   the first step is executed before the second step;
   in the first step, a pin is arranged inside the cavity;
   in the second step, the pin is moved relative to the cavity and the longitudinal core is injected into a space freed up by the pin.

2. The method according to claim 1, wherein the pin has a portion having substantially the same shape as the longitudinal core.

3. The method according to claim 1, wherein, in the first step, the application portion is injected around the pin.

4. The method according to claim 1, wherein the application portion is made of a first material, the longitudinal core being made of a second material, different to the first.

5. The method according to claim 4, wherein the second material is more rigid than the first material.

6. The method according to claim 1, wherein the longitudinal core is injected concomitantly with the movement of the pin.

7. The method according to claim 1, wherein the injection of the longitudinal core and the movement of the pin are synchronized so that the space freed up by the pin is constantly completely filled with the injected material.

8. The method according to claim 1, wherein the longitudinal core and the application portion are injected via the same injection orifice of the mold opening into the cavity.

9. The method according to claim 1, wherein the longitudinal core protrudes from the application portion longitudinally on a first side of the application portion.

10. The method according to claim 1, wherein the longitudinal core protrudes from the application portion longitudinally on a first side of the application portion, the longitudinal core and the application portion being injected via the same injection orifice of the mold situated longitudinally on a second side of the application portion opposite the first side.

11. The method according to claim 2, wherein, in the first step, the application portion is injected around the pin.

12. The method according to claim 2, wherein the application portion is made of a first material, the longitudinal core being made of a second material, different to the first.

13. The method according to claim 3, wherein the application portion is made of a first material, the longitudinal core being made of a second material, different to the first.

14. The method according to claim 2, wherein the longitudinal core is injected concomitantly with the movement of the pin.

15. The method according to claim 3, wherein the longitudinal core is injected concomitantly with the movement of the pin.

16. The method according to claim 4, wherein the longitudinal core is injected concomitantly with the movement of the pin.

17. The method according to claim 5, wherein the longitudinal core is injected concomitantly with the movement of the pin.

18. The method according to claim 2, wherein the injection of the longitudinal core and the movement of the pin are synchronized so that the space freed up by the pin is constantly completely filled with the injected material.

19. A method for producing a member for applying a cosmetic product, the application member comprising:
   an application portion;
   a longitudinal core, housed in the application portion; and
   wherein the application portion comprises a longitudinal support portion and a plurality of application elements protruding from the support portion, the longitudinal core being housed in the support portion and being radially enclosed in the application portion;
the method comprising the following successive steps:
   a first step for injecting the application portion into a cavity of a mold;
   a second step for injecting the longitudinal core into the cavity of the mold wherein,
   the first step is executed before the second step;
   in the first step, a pin is arranged inside the cavity;
   in the second step, the pin is moved relative to the cavity and the longitudinal core is injected into a space freed up by the pin;
   the longitudinal core is injected concomitantly with the movement of the pin;
   the injection of the longitudinal core and the movement of the pin are synchronized so that a space freed up by the pin is constantly completely filled with an injected material.

20. The method according to claim 19, wherein the support portion and the application elements are made of a same first material, the longitudinal core being made of a second material, different from the first, the second material being more rigid than the first material.

21. The method according to claim 19, wherein the support portion defines a cavity, the cavity being substantially cylindrically shaped and closed at one longitudinal extremity, the cavity housing an extremity of the longitudinal core.

22. The method according to claim 21, wherein the application portion is in radial contact with the longitudinal core on an entire inner surface of the cavity the inner surface being substantially cylindrical in shape.

23. The method according to claim 19, wherein the longitudinal core protrudes from the application portion through a single opening thereof.

24. The method according to claim 19, wherein the second portion completely surrounds a radial surface of the longitudinal core.

25. The method according to claim 19, wherein the application portion extends externally from the longitudinal member along a radial direction.

26. The method according to claim 19, wherein the application elements are integrally formed with the support portion.

27. The method according to claim 19, wherein longitudinal core is formed of a single part.

* * * * *